US011632452B2

(12) United States Patent
Delaporte (10) Patent No.: US 11,632,452 B2
(45) Date of Patent: Apr. 18, 2023

(54) EXPANDABLE DISPLAY MOBILE DEVICE

(71) Applicant: Lepton Computing LLC, Brooklyn, NY (US)

(72) Inventor: Stephen E. Delaporte, New York, NY (US)

(73) Assignee: Lepton Computing LLC, Brooklyn, NY (US)

( * ) Notice: Subject to any disclaimer, the term of this patent is extended or adjusted under 35 U.S.C. 154(b) by 0 days.

(21) Appl. No.: 17/705,195

(22) Filed: Mar. 25, 2022

(65) Prior Publication Data

US 2022/0311848 A1 Sep. 29, 2022

Related U.S. Application Data

(60) Provisional application No. 63/166,172, filed on Mar. 25, 2021.

(51) Int. Cl.
*G06F 3/041* (2006.01)
*H04M 1/02* (2006.01)
*G09F 9/30* (2006.01)

(52) U.S. Cl.
CPC .......... *H04M 1/0268* (2013.01); *G09F 9/301* (2013.01)

(58) Field of Classification Search
CPC .......... G09F 9/301; G06F 1/00; G06F 1/1652; G06F 2203/04102; G06F 1/1624; H04M 1/0268; G09G 2380/02
See application file for complete search history.

(56) References Cited

U.S. PATENT DOCUMENTS

| | | | | |
|---|---|---|---|---|
| 9,519,313 B2 * | 12/2016 | Kim | ......................... | G06F 1/166 |
| 9,678,539 B2 * | 6/2017 | Hayk | .................... | G06F 1/1624 |
| 10,111,346 B2 * | 10/2018 | Seo | ........................ | G06F 1/1643 |
| 10,194,543 B2 * | 1/2019 | Seo | ........................ | G06F 1/1626 |
| 10,553,135 B2 * | 2/2020 | Lee | ......................... | G06F 3/147 |
| 10,827,046 B1 * | 11/2020 | Li | ........................ | H04B 7/0814 |
| 10,936,017 B1 * | 3/2021 | Choi | .................... | G06F 1/1624 |
| 10,976,775 B1 * | 4/2021 | Cha | ........................ | G06F 1/1652 |
| 11,003,219 B1 * | 5/2021 | Kim | .................... | H04M 1/0237 |
| 11,112,826 B2 * | 9/2021 | Ko | .................... | G06F 3/04817 |
| 11,140,252 B1 * | 10/2021 | Choi | .................... | H04M 1/0235 |
| 11,315,443 B2 * | 4/2022 | Han | ........................ | G06F 1/1652 |
| 2012/0314400 A1 * | 12/2012 | Bohn | ........................ | G09F 9/35 |
| | | | | 361/679.01 |

(Continued)

*Primary Examiner* — Joe H Cheng
(74) *Attorney, Agent, or Firm* — Burns & Levinson LLP; Joseph M. Maraia (57) ABSTRACT

An expandable touch screen display device made up of a flexible display that can be reconfigured from a compact state to a plurality of expanded states. The form factor of the compact state is roughly the size of a typical handheld phone or smaller. The form factor of each of the expanded states is roughly the size of a tablet computer. An internal mechanism is provided for synching the motion of the device's expansion with the motion of the flexible display's end plate which provides a force to guide the display around the roller located at the edge of the device. The device may further include an integrated speaker and microphone, and sensors to indicate the expanded position of the display. In one embodiment, a module attached to, situated within, or otherwise associated with the device may contain all or substantially all processing and memory, along with a communications system.

13 Claims, 11 Drawing Sheets

(56) References Cited

U.S. PATENT DOCUMENTS

| | | | |
|---|---|---|---|
| 2013/0058063 A1* | 3/2013 | O'Brien | G06F 1/1624 361/807 |
| 2016/0100478 A1* | 4/2016 | Lee | H05K 1/028 361/749 |
| 2021/0366318 A1* | 11/2021 | Feng | G06F 1/1652 |

* cited by examiner

EXPANDABLE DISPLAY MOBILE DEVICE

CROSS REFERENCE TO RELATED APPLICATIONS

This application claims the benefit of U.S. Provisional Patent Application No. 63/166,172, filed on Mar. 25, 2021, which is incorporated in its entirety herein by reference.

TECHNICAL FIELD

The present invention relates generally to computing devices, and more particularly, to a computing device with a touch screen display that can be reconfigured from a compact state to multiple expanded states.

BACKGROUND

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small-scale touch screen device, however, is in the fact that it can often be cumbersome to physically interact with. This is especially apparent when selecting and manipulating features and inputting text, which can sometimes be imprecise for a user. In such handheld computing devices as a touch screen mobile phone, the limited size of the display can also significantly reduce the viewing capacity while watching videos, using graphic-intensive applications, and reading text. The rigid nature of a standard touch screen display can also limit the portability of a device when its form factor is in the larger size range for a phone, or at the scale of a tablet, which makes physical expansion a desirable feature. Additionally, because an expandable device fundamentally requires a force to expand the device and a force to provide a guide for the edge of the display as it is displaced internally, a unique mechanism is desirable to synch the motion of both mechanical functions.

SUMMARY

According to one aspect, an apparatus is provided. The apparatus includes a flexible touch-sensitive display composed of a first end and a second end. The first end is attached to a first structural support, and the second end is attached to an end plate. The end plate is housed within a second structural support. The flexible touch-sensitive display further comprises having a fully retracted state, a partially expanded state, and a fully expanded state. The apparatus further includes a lever that spans between the first structural support and the second structural support mechanically engaged with the end plate and each structural support such that as the structural supports are moved to expand or retract the flexible display, the sliding motion of the structural supports activates the rotational motion of the lever so that it forces the end plate to slide within the second structural support.

In one exemplary embodiment, the end plate includes a first pin, and the lever includes at least one slot such that the first pin of the end plate is mechanically engaged with the slot of the lever. In one exemplary embodiment, the second support includes a fourth slot such that the first pin of the end plate is mechanically engaged with the fourth slot of the second structural support.

In one exemplary embodiment, the end plate includes a second pin, and the second structural support includes a first slot such that the second pin of the end plate is mechanically engaged with the first slot of the second structural support.

In one exemplary embodiment, the end plate includes a third pin; and the second structural support includes a second slot such that the third pin of the end plate is mechanically engaged with the second slot of the second structural support.

In one exemplary embodiment, the lever includes a first pin; and the second structural support includes a third slot such that the first pin of the lever is mechanically engaged with the third slot of the second structural support. In one exemplary embodiment, the third slot of the second structural support is curved.

In one exemplary embodiment, the lever includes a second pin, and the first structural support includes a first slot such that the second pin of the lever is mechanically engaged with the first slot of the first structural support.

In one exemplary embodiment, the lever includes a third pin, and the first structural support includes a second slot such that the third pin of the lever is mechanically engaged with the second slot of the first structural support.

In one exemplary embodiment, the second structural support includes at least one slot such that the first pin of the end plate is mechanically engaged with the slot of the lever.

In one exemplary embodiment, the first structural support segment and the second structural support segment are mechanically engaged to slide parallel with each other. In one exemplary embodiment, the sliding motion of the first structural support and the second structural support is driven by an actuator.

In one exemplary embodiment, the second end of the flexible display wraps around a rounded edge attached to the side of the second structural support.

In one exemplary embodiment, the rounded edge includes a roller bearing.

In one exemplary embodiment, the rounded edge includes a ball bearing.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

There is a need for touch screen display devices that can be expanded in size without sacrificing the convenience of being compact or handheld. There is also a need for a motion synching mechanism such that a single force can be applied to the device either externally or internally allowing the motion of the device's sliding expansion and the motion of the flexible display's internal guidance around an internal roller to be synched together. This synching mechanism can also implement a single actuator to drive the expansion and retraction of the device opposed to having multiple actuators which would otherwise be needed.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 1:
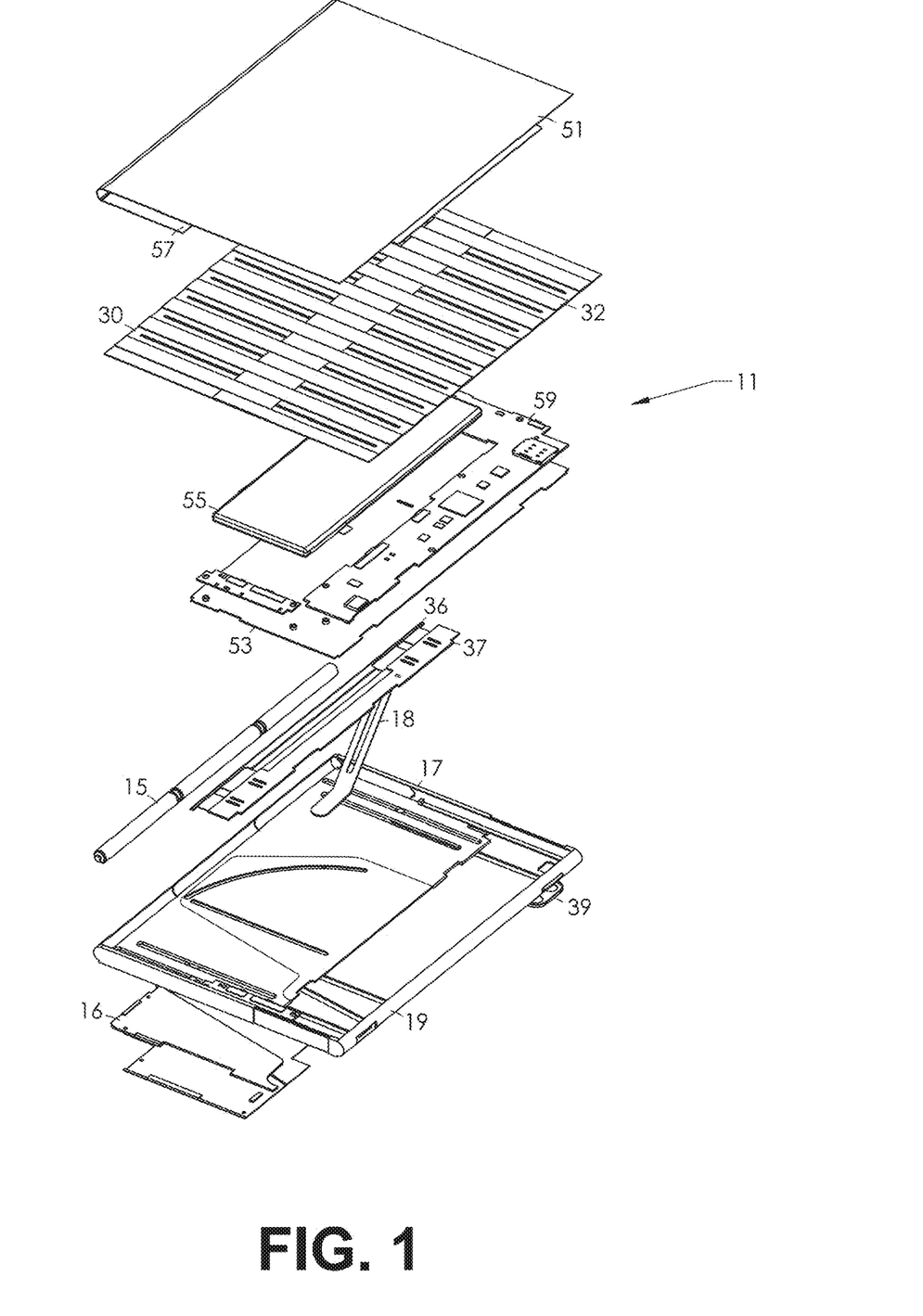
FIG. 1 is an exploded perspective view of an expandable mobile device with its flexible display, its two main shell structure supports, the device's synching mechanism, its internal electronics, and its sliding slat structures that support the viewable portion of the flexible display.

In accordance with the exemplary embodiment shown in FIG. 1. an expandable mobile device 11 is illustrated as an exploded diagram to highlight the device's main components, which includes a flexible display 51 that can expand and retract through the display's end plate 36 which is coupled with a linear motion guide 37 that is driven by a slotted lever 18. Slotted lever 18 is driven by the sliding motion of the main shell structure supports 17 and 19 as they slide inward towards each other to retract the device, and outward away from each other to expand the device. As slotted lever 18 is rotated along slots from the sliding force of shell structure supports 17 and 19, a pin affixed to the underside of motion guide 37 is forced to move as it is engaged with the slot of slotted lever 18, which in turn forces motion guide 37 and its attached end plate 36 to slide back and forth along the internal surface of shell structure support 17. The display end portion 57 of flexible display 51 is attached to display end plate 36 and this allows the device to slide in and out of the opening at the left edge of shell structure support 17 as it rolls around edge roller 15. A back panel 16 underneath shell structure support 17 is also integrated to help enclose the internal mechanics of the device. Additional rollers may be added across from the main edge roller 15 so that the flexible display device can be captured between two sets of rollers. Ball bearings may also be used along the back surface or the front surface of the flexible display at any point along the internal structures supporting the display within the device. A battery 55 and the device's main electronic board 59 sit above isolation plate 53 which allows all the electronic components to be isolated from the mechanical motion of flexible display 51 and its attached end plate 36 and linear motion guide 37 as it moves back and forth. Cameras 39 are also included on the back side of shell structure support 19. Slat structures 30 and 32 are shown engaged with each other at the top of the diagram below flexible display device 51 which provide an underlying structural support for flexible display 51. As flexible display 51 is rolled in and out of the device's shell structure support 17 slat structure 30 and slat structure 32 are slid inward towards each other as the device is retracted and then outward away from each other as the device is expanded. The top portion of the slats provides a continuous surface so that the underside of flexible display 51 can remain flat against the surface of slat structures 30 and 32 as they slide against each other. Flexible display 51 can remain affixed to slat structure 32 while it is free to slide along slat structure 30. This is where having flexible display 51 in tension around edge roller 15 can be advantageous as potential gaps between the underside of flexible display 51 and slat structure 30 would be avoided. Other methods that could be employed to avoid this gap include using magnets along the under surface of flexible display 51 and the top surfaces of slat structures 30 and 32 such that the two surfaces remain tangent with each other, as well as having magnets along the surface of edge roller 15, or a hook or loop structure that would be attached at multiple points in rows or a grid array on the underside of flexible display 51 such that it would sit within linear channels inset within slat structures 30 and 32. These hook or loop structures could engage with an undercut of the linear channels that would run through slat structures 30 and 32, or cables could run through them along the length of the flexible display 51 to provide a downward force against the bottom of flexible display such that it is always tangent with the surface. This cable could run from the inside of the device and also wrap around edge roller 15 as flexible display 51 rolls in and out of the device. This cable or series of cables could remain in place with shell structure support 17. Teeth attached to the underside of flexible display 51 may also be implemented to engage with gear teeth that could be inset within sections of edge roller 15 to provide a smooth transition between different retracted and expanded states as the flexible display 51 is moved in and out of shell structure support 17. A timing belt coupled directly to the underside of flexible display 51 would also provide a similar function when engaged with gear teeth integrated along the circumference of edge roller 15. An actuator may also be integrated to directly drive edge roller 15. This same actuator could also simultaneously provide a force to expand and retract the device while rotating the roller which would force flexible display 51 to move in and out, especially when teeth are engaged between sections of the roller and the underside of flexible display 15.

Figure 2:
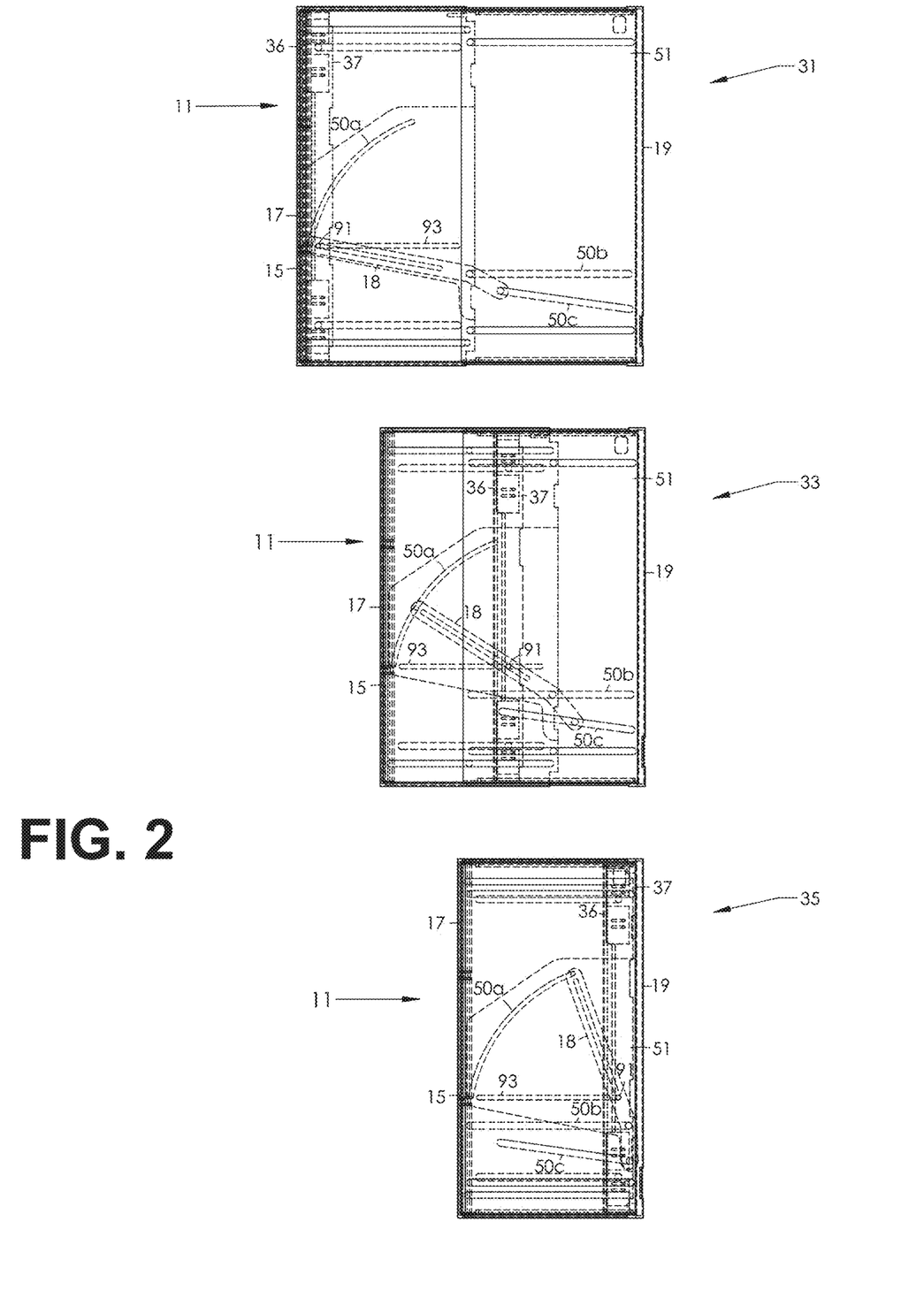
FIG. 2 is a diagram showing the motion sequence of the expandable mobile device and how its motion synching mechanism translates the sliding motion of the device's two shell structures to the flexible display's end plate motion guide.
Figure 3:
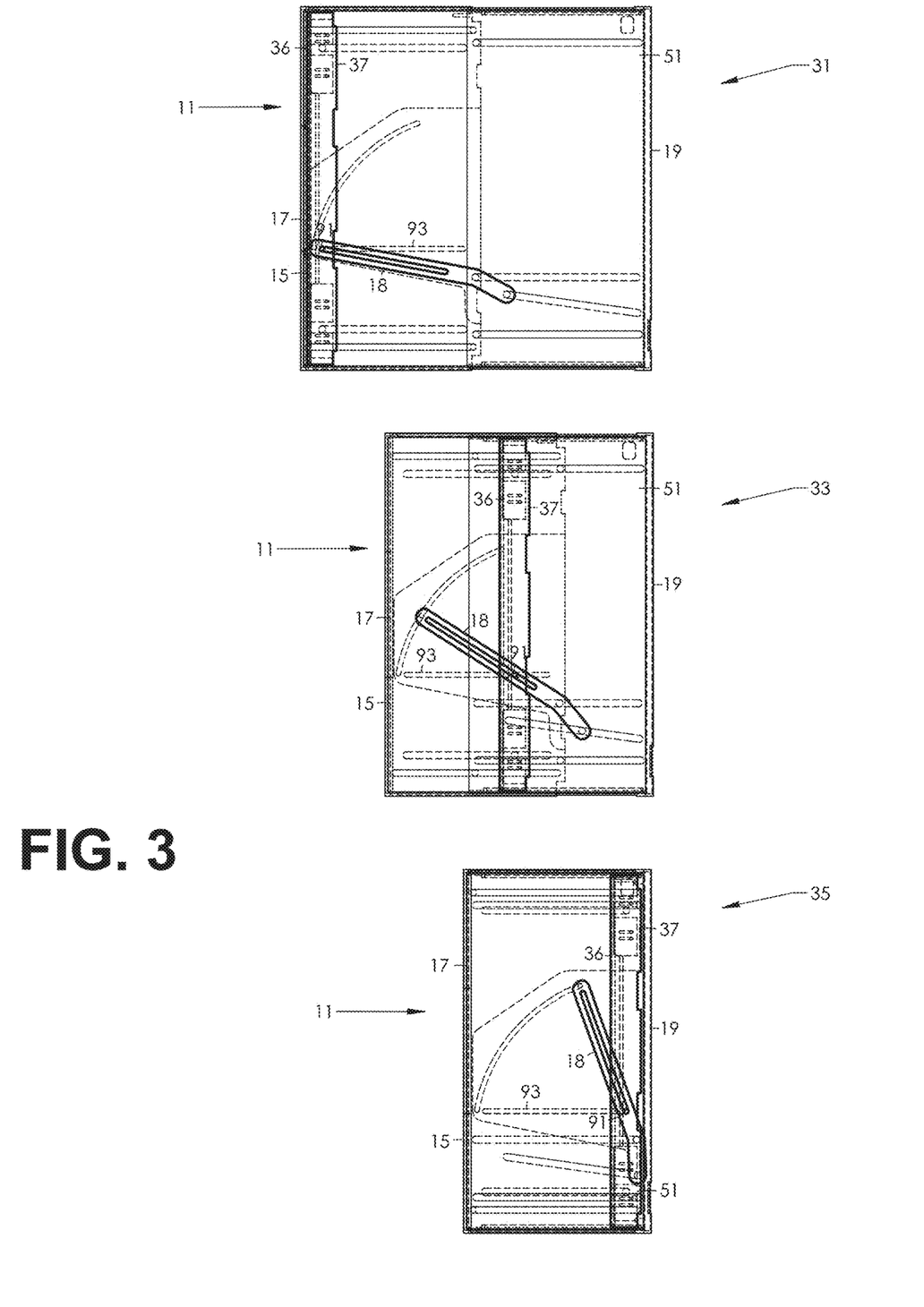
FIG. 3 is a diagram showing the motion sequence of the expandable mobile device to highlight the slotted lever used to translate the sliding motion of the device's two shell structures to the flexible display's end plate motion guide.

Shown in FIG. 2 is a diagram of the motion sequence for expandable mobile device 11 as it changes from an expanded state to a retracted state. The diagram is shown in a first position 31, where it is hilly expanded, a second position 33, where it is partially expanded, and a third position 35, where it is fully retracted. These same three positions are also shown in the remaining diagrams of the present application. It is important to note that while this diagram and the follow up diagrams show the device retracting, the mechanical design can also drive and synch motion in the opposite direction of what is illustrated as the device is expanded. The main objective of FIG. 2 and FIG. 3 is to highlight how a single point of motion can synch the two primary motions required for the device to retract and expand, which includes the motion of flexible display 51 being pulled or pushed internally, and the motion of shell support structures 17 and 19 which are also being pulled and pushed to expand or retract the device. It is important to note that the expanding and retracting, motion of shell support structures 17 and 19 and the sliding motion of end plate 36, and its attached linear motion guide 37, are not completely linear to each other, i.e., end plate 36 and linear motion guide 37 are driven by a rotational motion, as emphasized by slot 50a, which slotted lever 18 moves along to drive end plate 36 and linear motion guide 37 are driven by direct linear motion. To account for the offset in motion frequency, an elastic component or material, or springs can be situated between end plate 36 and linear motion guide 37 such that the display end portion 57 of flexible display 51 has a perpetual three applied to it, even when there is a gap between end plate 36 and linear motion guide 37. This allows flexible display 51 to be in tension which would ultimately provide a compressive force against edge roller 15 so that there is no slack on flexible display 51 as it is being slid and rolled in and out of shell support structure 17. In addition to slot 50a, slots 50b and 50c provide guidance for slotted lever 18 in such a way that it can rotate as shell structure supports 17 and 19 are pushed or pulled against each other to retract and expand the device. Slot 93 is what allows end plate 36 and linear motion guide 37 to move linearly as pin 91, which is affixed to linear motion guide 37, slides within slot 93 and the slot within slotted lever 18 to force end plate 36 and linear motion guide 37 to slide back and forth along shell structure support 17. In FIG. 3, slotted lever 18 and end plate 36 and linear motion guide 37 are highlighted to emphasize their motion and how they engage with each other as the full assembly of the device is retracted or expanded.

Figure 4:
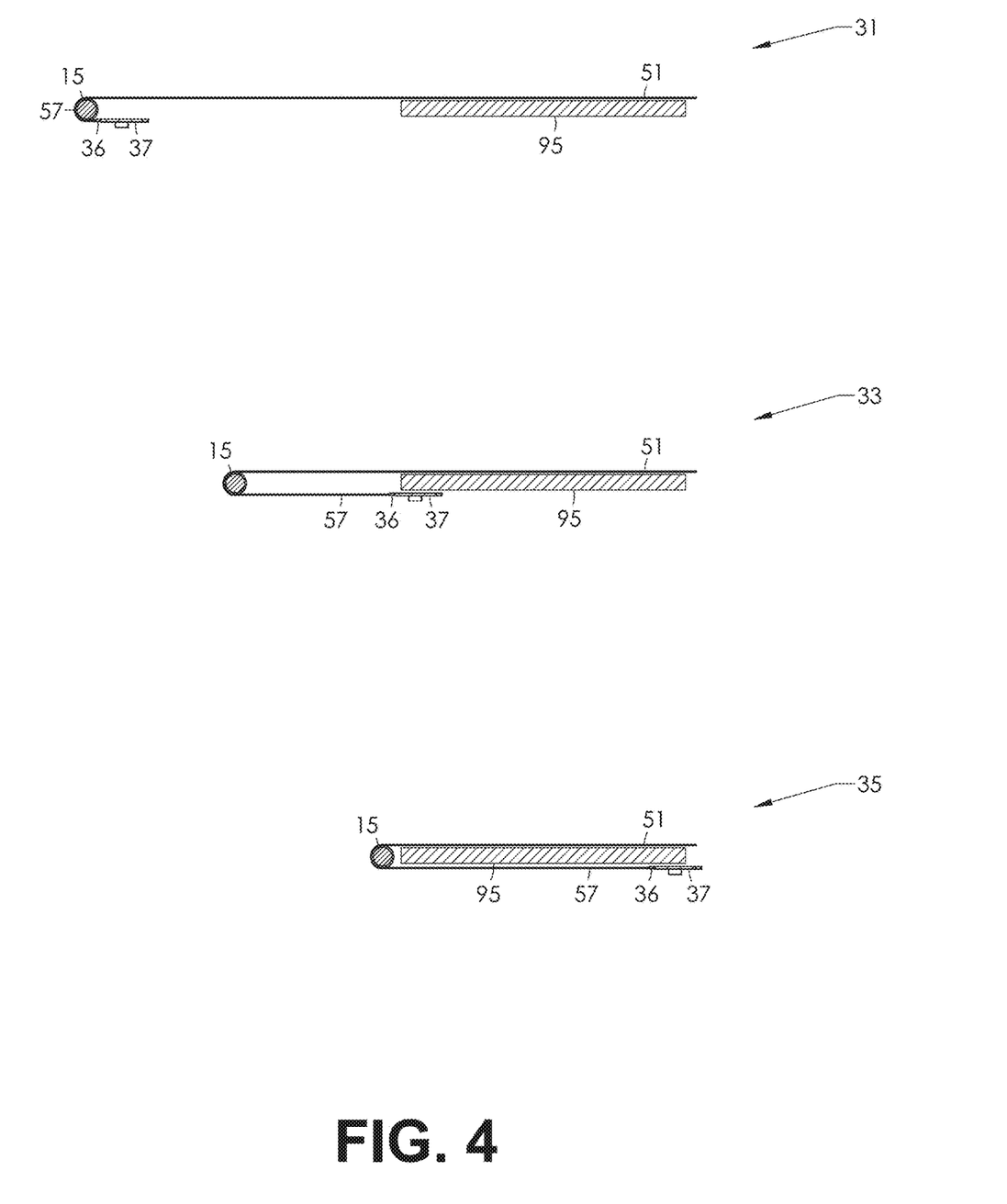
FIG. 4 is a sectional view diagram that corresponds with FIGS. 2 and 3 where the motion sequence of the expandable mobile device's flexible display, its end plate guide, and the device's edge roller are highlighted.
Figure 5:
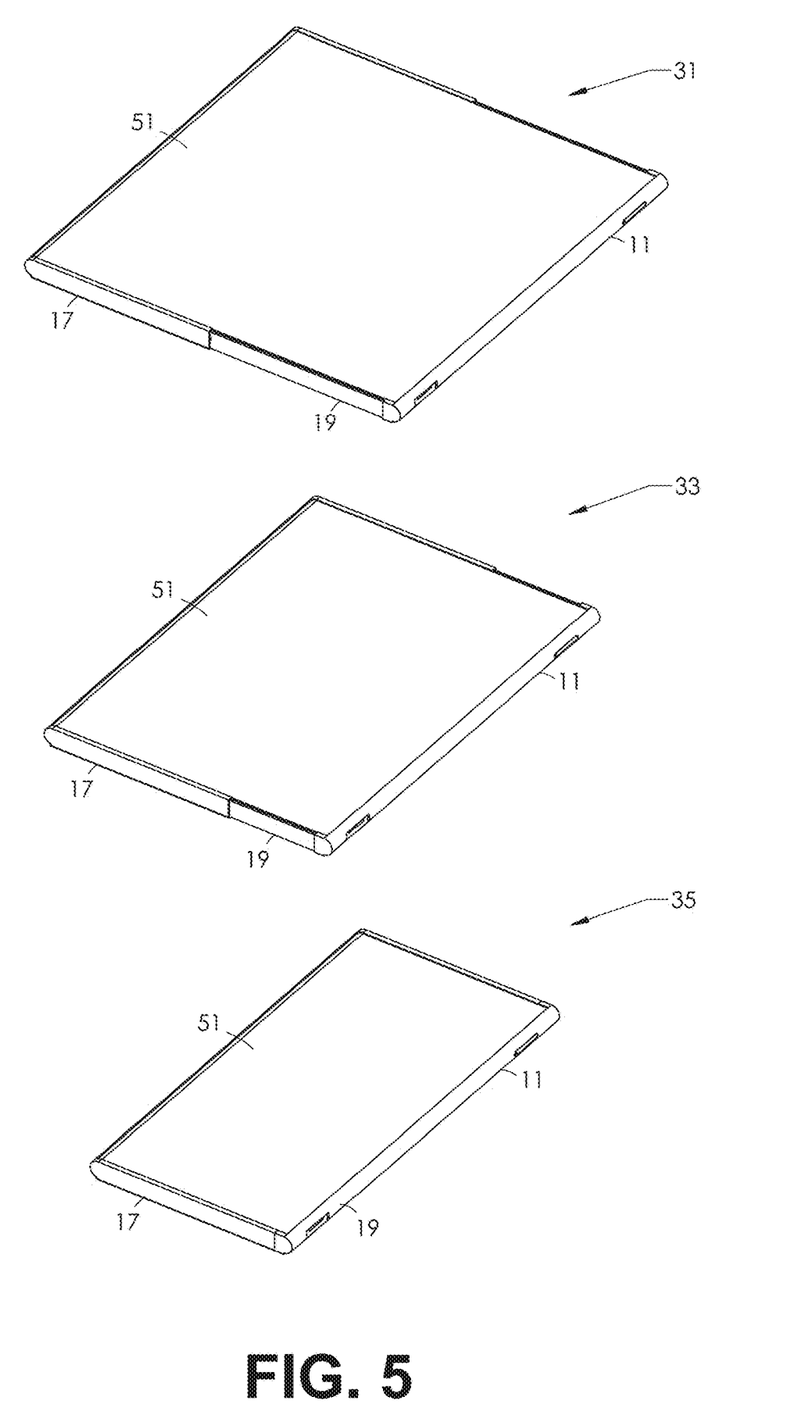
FIG. 5 is a perspective view of a motion sequence diagram for the expandable mobile device shown transitioning from an expanded state to a retracted state.
Figure 6:
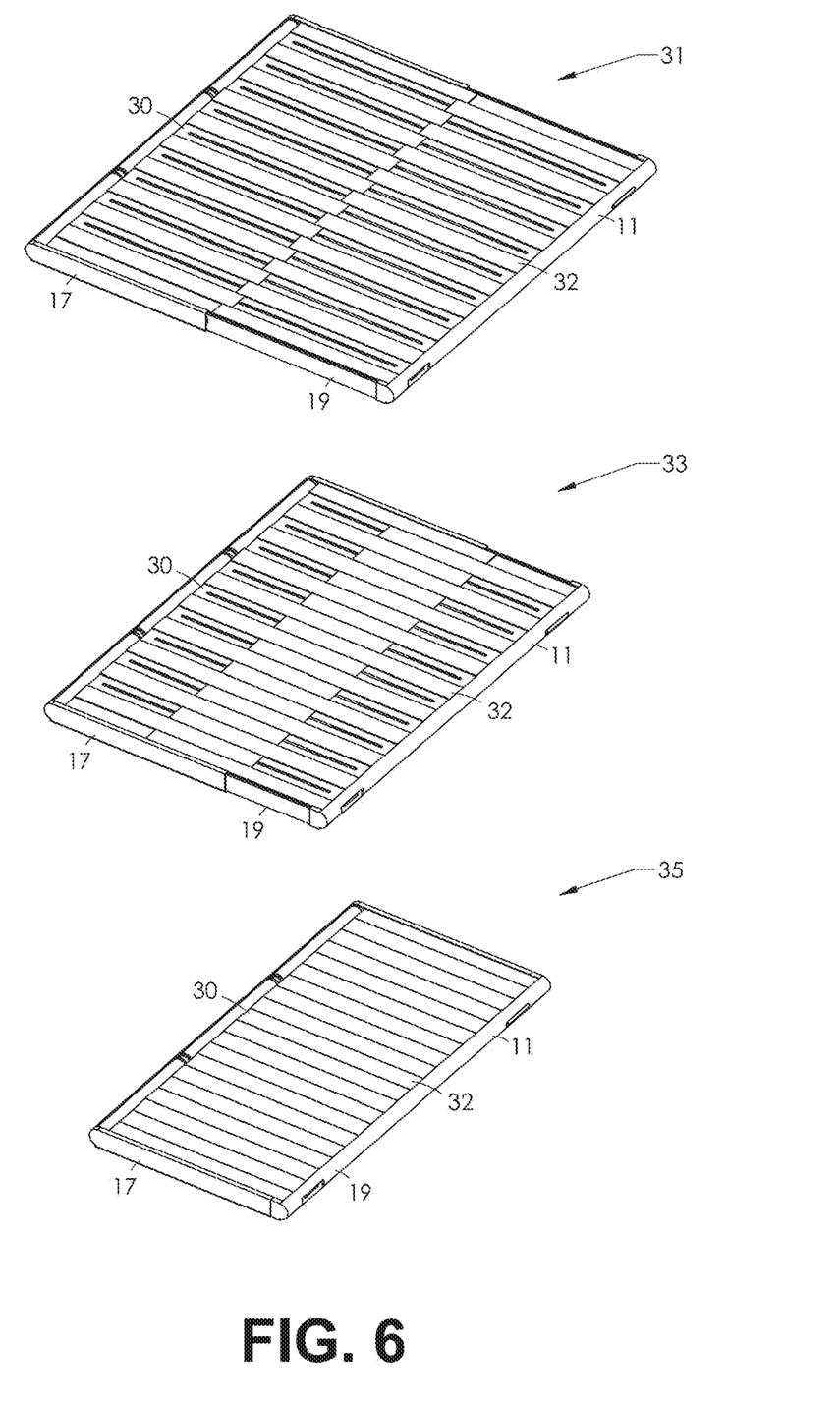
FIG. 6 is a perspective view of a motion sequence diagram for the expandable mobile device shown transitioning from an expanded state to a retracted state, as it is in FIG. 6, but with its flexible display removed to highlight the underlying sliding slat structures.

FIG. 4 is a sectional view diagram that corresponds with FIGS. 2 and 3 where the motion sequence of the expandable mobile device and its flexible display 51 is shown moving along edge roller 15 as the device is retracted. In this diagram the motion trajectory of display end portion 57 and its attached end plate 36 and linear motion guide 37 are also emphasized as they can slide linearly and parallel to the exposed part of flexible display 51 on the above surface of the device. Block 95 is used to represent the area where the battery 55 and main electronic board 59 sit within the device which are isolated through isolation plate 53 from the sliding motion below of display end portion 57 and its attached end plate 36 and linear motion guide 37.

Figure 7:
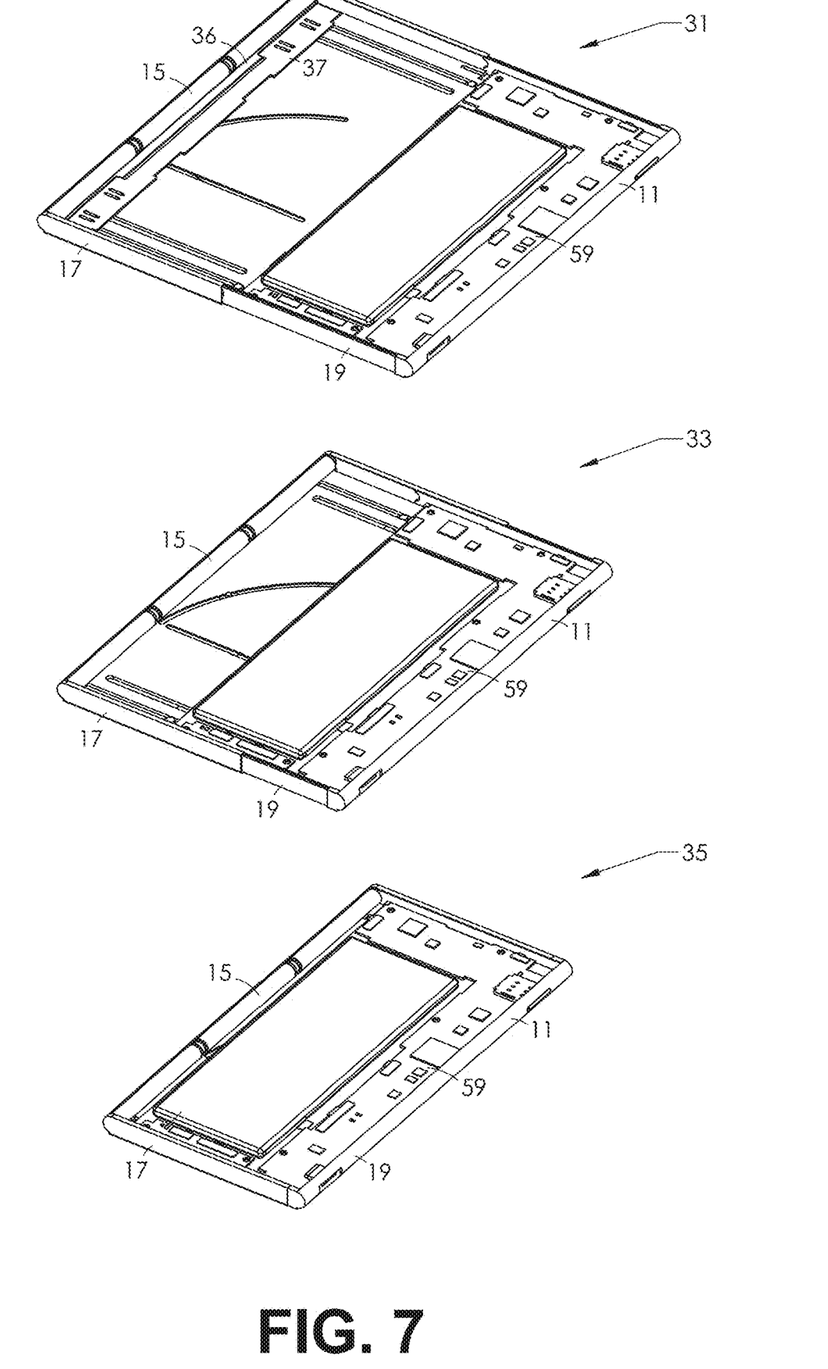
FIG. 7 is a perspective view of a motion sequence diagram for the expandable mobile device shown from previous FIGS. 5 and 6 with its flexible display and sliding slat structures removed to highlight the edge roller and the display's end plate motion to a position underneath the battery and electronics as the device is retracted.

FIG. 5-FIG. 8 show the same perspective view of a motion sequence diagram for expandable mobile device 11 as it transitions from an expanded state to a retracted state. With each of these figures, a major layer of components is shown to highlight the complete assembly of the device and how the retracting and expanding motion relates to each of those layers. For FIG. 6, flexible display 51 is removed to highlight the underlying sliding slat structures 30 and 32 which are made up of slats that can slide inward or outward against each other and may also use slots and pins for additional guidance to ensure that the slats are engaged with each other as they slide to retract and expand the device. FIG. 7 emphasizes what is illustrated in FIG. 4, but with the battery 55 and main electronic board 59 integrated. End plate 36 and linear motion guide 37 can also be seen moving underneath the battery 55 and main electronic board 59 and the isolation plate 53 that they sit above as the device is fully retracted.

Figure 8:
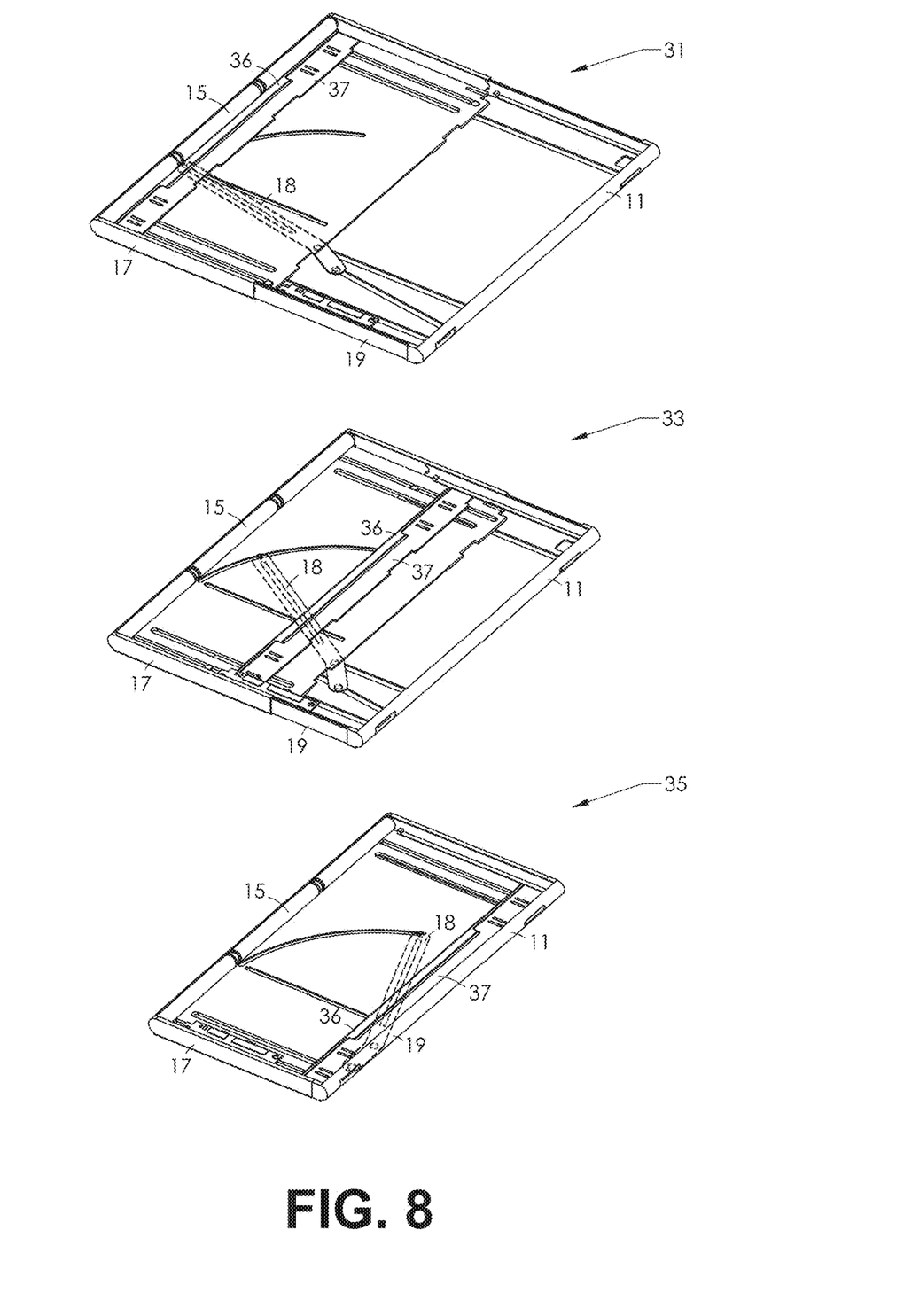
FIG. 8 is a perspective view of a motion sequence diagram for the expandable mobile device shown from previous FIGS. 5, 6 and 7 with its flexible display, sliding slat structures, battery, and electronics removed to highlight the display's end plate and its complete motion.

FIG. 8 shows the same motion sequence diagram from the previous three figures, but with only the motion synching mechanism illustrated. This diagram also highlights what is shown in FIGS. 2 and 3 from a perspective view to show how slotted lever 18 moves below the guiding slots integrated with shell structure support 17 and above the guiding slots integrated with shell structure support 19 so that it can sit within the small gap that is present between both shell structure supports to remain isolated from the motion of end plate 36 and its attached linear motion guide 37 while also driving it through its guiding slots of shell support structure 17.

Figure 9:
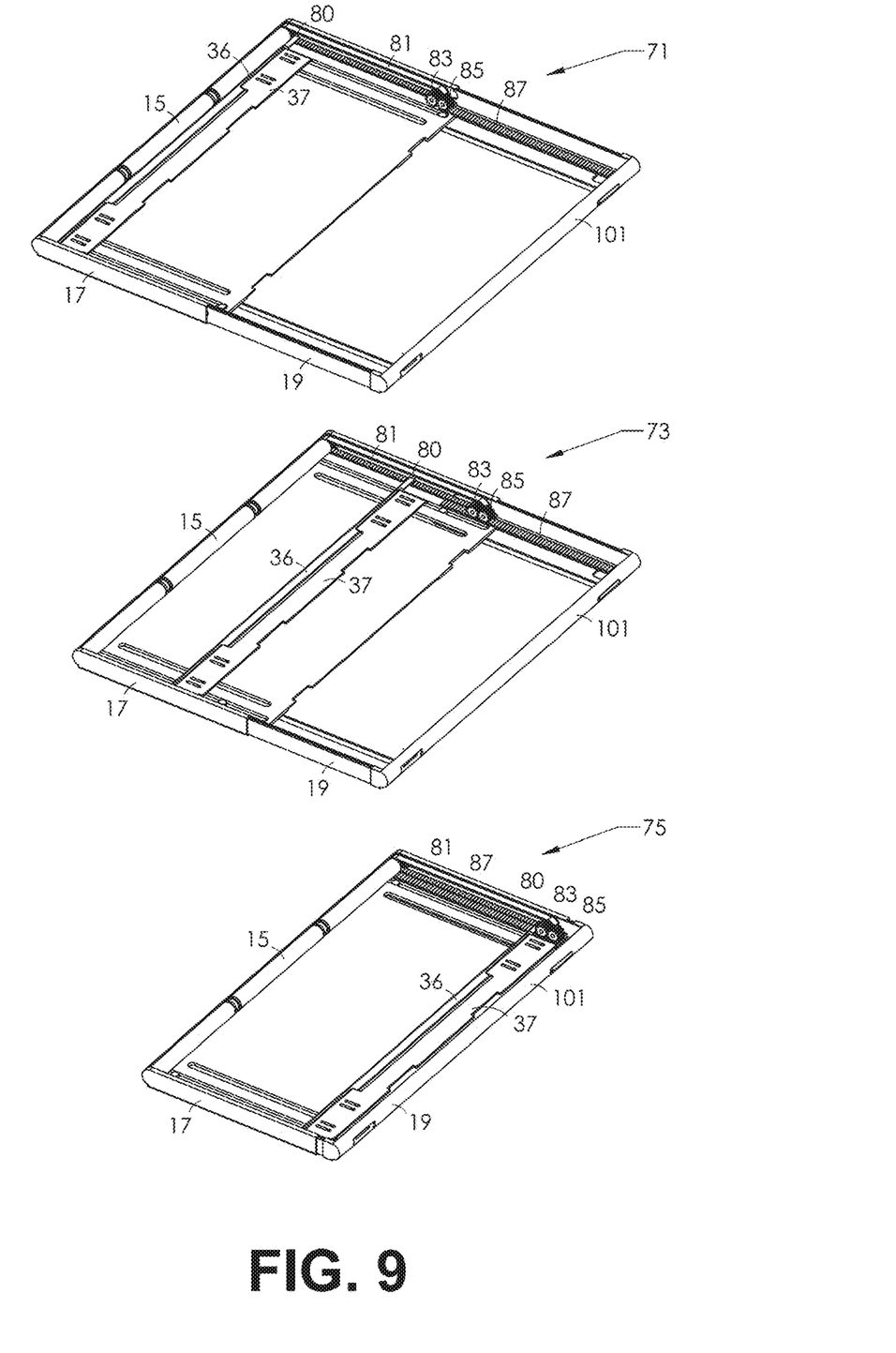
FIG. 9 is a perspective view of a motion sequence diagram for an expandable mobile device shown without its flexible display to highlight the display's end plate and a drive mechanism using a timing belt, pulleys and a rack and pinion.

FIG. 9 is a perspective view of a motion sequence diagram for expandable mobile device 101 shown without its flexible display to highlight the display's end plate 36, where the end of the flexible display gets attached, and a drive mechanism using a timing belt 81, which includes two pulleys on both ends. On the inner end of timing belt 81, a gear and pulley 83 are coupled together to drive timing belt 81 to move back and forth within shell support structure 17. The motion of timing belt 81 is translated through a clamp 80 which extends from end plate 36 which then forces the end of the flexible display back and forth inside shell support structure 17. This motion is ultimately synched with the motion of shell support structure 17 and 18 as they slide against each other because the rack 87 located along the base of shell support structure 19 rotates gear pinion 85, which in turn rotates gear and pulley 83 to then move timing belt 81, clamp 80, end plate 36, motion guide 37, and the flexible display that gets attached to end plate 36. Position 71 shows the expandable mobile device 101 in a fully expanded state, position 73 then shows the device in a partially retracted stated, and position 75 shows the device in a fully retracted state, similar to how the flexible display is shown retracting in FIG. 5. The advantage of using this method of motion synching is that the motion velocity for the retraction and expansion of the device and the motion for the internal sliding of the end portion of the display would be consistent relative to each other. It is also important to note that an actuator or multiple actuators could be used to drive or facilitate the motion of any of the mechanisms that have been disclosed, and in this ease would be coupled to gear and pulley 83, Or gear pinion 85.

Figure 10:
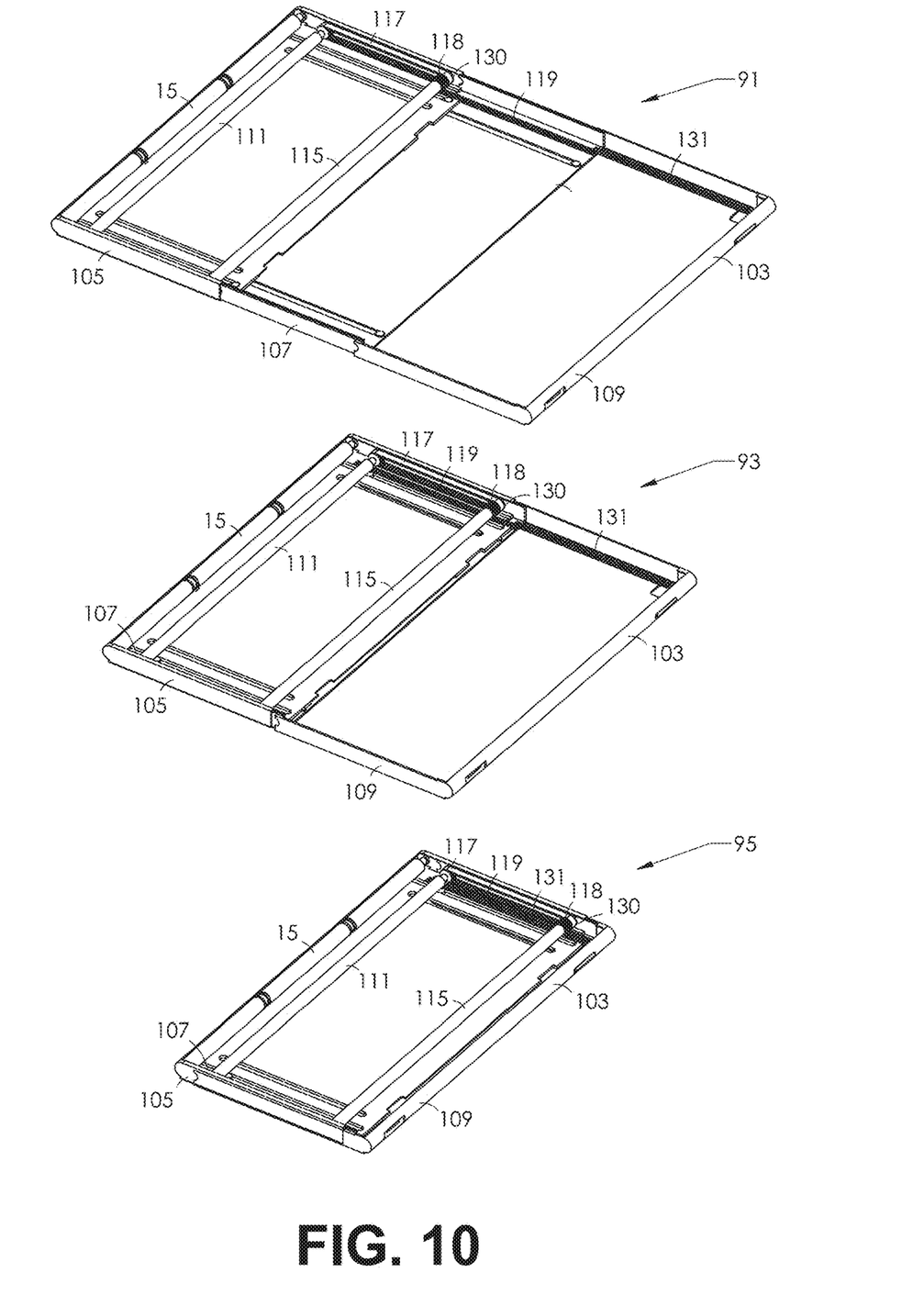
FIG. 10 is a perspective view of a motion sequence diagram for an expandable mobile device that has a greater expansion ratio by using three shell structures and a drive mechanism using an actuator, timing belt, pulleys, racks and a pinion.
Figure 11:
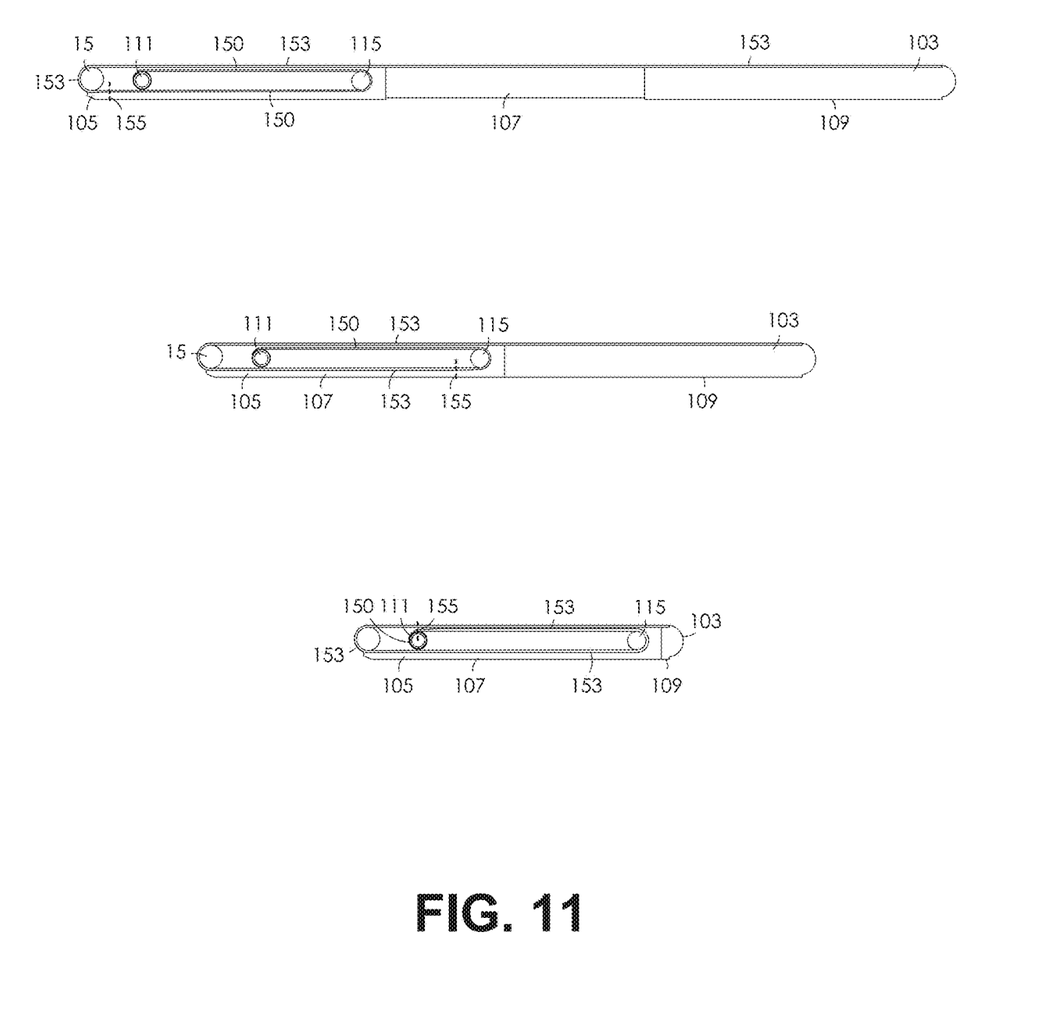
FIG. 11 is a side view of the motion sequence diagram for the expandable mobile device shown in FIG. 10 which highlights the two internal rollers and spool needed to enable the augmented expansion which the flexible display wraps around along with a thin film that is attached to the end of the flexible display so that it can be unraveled from the spool.

Referring to FIG. 10 and FIG. 11 an expandable display device 103 is shown having an augmented expansion by employing three shell support structures 105, 107, and 109, and a spool 111 where a material is attached at the end of the flexible display 153, such as a durable film 150, that can wrap continuously in layers around spool 111 such that the flexible display can be deployed as the attached film 150 in unraveled from spool 111, which would allow the flexible display 153 to wrap in different directions around the edge of multiple rollers displaced from each other, which includes edge roller 15 and internal roller 115, allowing for an expansion of three times the width of the device in the phone state or more. Having the two rollers 15 and 115 located on opposite sides of shell structure support 105 such that flexible display 153 can wrap around the edges of both and then continue back to spool 111 located next to the first edge roller 15, also allows flexible display 153 to be deployed while remaining in tension as the device is expanding so that it can provide a continuous compressive force against both rollers 15 and 115 and then retract back towards spool 111 without being damaged as the device is retracting. The layer of material that would wrap around spool 111, such as a durable film 150, which is attached to the end of the flexible display at transition point 155, would ultimately need to be used instead of flexible display 153 itself as the flexible display is too thick and rigid to feasibly be wrapped around a spool in layers. Racks 119 and 131 are each attached with shell support structures 107 and 109 respectively. As shell support structures are moved to retract or expand the device, racks 119 and 131 ultimately drive gear and pulley 118, which in turn drives timing belt 117 to move linearly back and forth. Timing belt 117 in turn rotates spool 111 so that film 150 can unravel from spool 111, which then deploys flexible display 153 as film 150 and flexible display 153 are attached at transition point 155. An actuator 130 can drive the gear and pulley 118 to rotate, which would then drive both the expansion and retraction of the device along with the deployment of the flexible display device internally through the rotational motion of spool 111. This allows the motion of the device to be automatic, but it is not necessary to be integrated as the device can still be manually moved through a user's hands pulling and pushing on the end of shell supports structures 105 and 109. This is also the case for all embodiments described as well. A switching, mechanism can be used to force the gear and pulley 118 to change from one rack to another as the shell structures 105, 107, and 109 are slid to an expanded or retracted state. This same gear and pulley 118 could also ultimately drive spool 111 to rotate such that it would deploy the film and its attached flexible display 153 as the device is expanded and then pull it back into the spool as the device is retracted without having to integrate timing belt 117. Having this mechanism and multiple rollers also allows the device to remain thinner while providing the extra flexible display material to make the larger expansion occur.

While certain features of the invention have been illustrated and described herein, many modifications, substitutions, changes, and equivalents will now occur to those of ordinary skill in the art. It is, therefore, to be understood that the appended claims are intended to cover all such modifications and changes that fall within the true spirit of the invention.

What is claimed is:

1. An apparatus comprising:
    (a) a flexible touch-sensitive display composed of a first end and a second end; wherein:
        (1) the first end is attached to a first structural support;
        (2) the second end is attached to an end plate which is housed within a second structural support;
        (3) the flexible touch-sensitive display further comprises having a fully retracted state;
        (4) the flexible touch-sensitive display further comprises having a partially expanded state; and
        (5) the flexible touch-sensitive display further comprises having a fully expanded state; and
    (b) a lever that spans between the first structural support and the second structural support mechanically engaged with the end plate and each structural support such that as the structural supports are moved to expand or retract the flexible touch-sensitive display, the sliding motion of the structural supports activates the rotational motion of the lever so that it forces the end plate to slide within the second structural support.

2. The apparatus of claim 1 wherein;
the end plate includes a first pin; and the lever includes at least one slot such that the first pin of the end plate is mechanically engaged with the slot of the lever.

3. The apparatus of claim 2 wherein:
the second structural support includes a second slot such that the first pin of the end plate is mechanically engaged with the second slot of the second structural support.

4. The apparatus of claim 2 wherein:
the second structural support includes at least one slot such that the first pin of the end plate is mechanically engaged with the slot of the lever and the slot of the second structural support.

5. The apparatus of claim 1, wherein:
the end plate and the second structural support are mechanically engaged to slide parallel with each other.

6. The apparatus of claim 1 wherein:
the lever includes a first pin; and the second structural support includes a first slot such that the first pin of the lever is mechanically engaged with the first slot of the second structural support.

7. The apparatus of claim 6 wherein:
the first slot of the second structural support is curved.

8. The apparatus of claim 1 wherein:
the lever includes a second pin; and the first structural support includes a first slot such that the second pin of the lever is mechanically engaged with the first slot of the first structural support.

9. The apparatus of claim 1 wherein:
the lever includes a third pin; and the first structural support includes a second slot such that the third pin of the lever is mechanically engaged with the second slot of the first structural support.

10. The apparatus of claim 1 wherein:
the first structural support and the second structural support are mechanically engaged to slide parallel with each other.

11. The apparatus of claim 10 wherein:
the sliding motion of the first structural support and the second structural support is driven by an actuator.

12. The apparatus of claim 1 wherein:
the second end of the flexible touch-sensitive display wraps around a rounded edge of the second structural support.

13. The apparatus of claim 12 wherein:
the rounded edge includes a roller.

\* \* \* \* \*